United States Patent [19]

Balliet et al.

[11] Patent Number: 4,467,196
[45] Date of Patent: Aug. 21, 1984

[54] SINGLE FIBER OPTIC WAND SYSTEM

[75] Inventors: Layton Balliet, Boca Raton; Donald H. Coffman; Carlos Gomez, both of Delray Beach, all of Fla.

[73] Assignee: International Business Machines Corporation, Armonk, N.Y.

[21] Appl. No.: 393,258

[22] Filed: Jun. 29, 1982

[51] Int. Cl.³ .............................................. G06K 7/14
[52] U.S. Cl. .................................... 250/227; 235/462; 235/472
[58] Field of Search .................. 250/227, 568, 231 R; 235/462, 463, 472, 473, 464, 465, 467

[56] References Cited

U.S. PATENT DOCUMENTS 3,748,483 7/1973 Englund et al. ................. 235/472 X
3,983,389 9/1976 Cowardin et al. .................. 250/227
4,154,529 5/1979 Dyott .............................. 250/227 X Primary Examiner—David C. Nelms
Assistant Examiner—Edward P. Westin
Attorney, Agent, or Firm—Harold H. Sweeney, Jr.

[57] ABSTRACT

A fiber optic scanner system for reading coded patterns is provided having a single optical fiber extending from the reading end of the scanner tip to a remote terminal. The remote terminal includes an optical signal generator for generating and driving light pulses along the single optical fiber to the reading end of the scanner member so as to illuminate a bar code and obtain reflected pulses therefrom which are carried to the remote terminal receiver and decoded.

10 Claims, 6 Drawing Figures

SINGLE FIBER OPTIC WAND SYSTEM

BACKGROUND OF THE INVENTION

1. Field of the Invention

This invention relates to a scanner and, more particularly, to a probe scanner for detecting coded elements in which the transmitted and received light pulses are multiplexed in a single fiber.

2. Prior Art of the Invention

Wands for reading bar codes are presently expensive and require rugged construction to withstand the usual normal handling. They typically contain light emitting diodes, photo detectors, optical components and electronic circuits which result in complexity and high cost. Inherent repeated use requires that the wand be replaced or repaired often. Accordingly, a low cost, rugged, throw-away wand would minimize maintenance and reduce the overall operating expense.

There are many hand-held probes for detecting bar codes on items in the patent literature. For example, U.S. Pat. Nos.:

3,584,779, 06/71, Kessler et al
3,610,891, 10/71, Raclazek
3,711,723, 01/73, McMurtry
3,766,364, 10/73, Krecioch et al
3,781,555, 12/73, Keefe
3,869,599, 04/75, Sansone
3,937,558, 02/76, Mukai et al
3,947,088, 03/76, French
4,027,982, 06/77, Ohishi With one exception, each of these patents requires the use of a first fiber, or bundle of fibers, for transmitting light from the light source to the reading end of the probe and a second fiber, or bundle of fibers, for returning the reflected light from the end of the probe to the light detector. None of them disclose the use of a single fiber for carrying the light in both directions. The one exception above is the McMurtry patent assigned to the same assignee as the present application, International Business Machines Corporation. The arrangement in the McMurtry U.S. Pat. No. 3,711,723 uses a single bundle of fibers for both the transmitted and reflected light. It does not use a single fiber and the pulse generation and detection of the present invention. It uses a continuous light source as do all of the above listed patents. The McMurtry patent keeps the reflected light separated from the transmitted light by means of a rather complex optical mirror and aperture arrangement.

SUMMARY OF THE INVENTION

The main advantage of the present invention is the use of a single fiber within the hand-held wand for transmission of light pulses in both directions, that is, for illuminating the bar code and for reading the reflected pulses therefrom. Using the single fiber and the pulse type coding provides an inexpensive probe as well as higher resolution for detecting the light reflecting transitions, that is, the edges of the reflective bar codes.

The present invention relates to a fiber optic scanner system for reading coded patterns when the hand-held probe is moved across the coded pattern. The hand-held scanner or probe consists of a housing having a scanner tip attached at the reading end thereof. At the other end of the probe housing is located the connector end. A single optical fiber is located in the housing and extends into the scanner tip into the reading position. The other end of the fiber emerges from the connector end of the housing. A remote terminal is associated with the scanner and has a single optical fiber link connected between the scanner probe and the remote terminal. An optical signal generator is located in the remote terminal for producing and transmitting optical pulses of a given width and at a predetermined frequency. These optical pulses are sent over the fiber link and through the fiber in the scanner housing to the scanner tip from whence they are beamed onto the bar code. A receiver is located in the remote terminal, receiving light pulses reflected from the coded pattern into the reading end of the single optical fiber transmission line located in the scanner tip. A light coupler is also located in the remote terminal for coupling reflected light pulses from the single fiber into the receiver. The optical signal generator pulse width and frequency and the bar code width and spacing are selected to produce the reflected light pulses between the generated light pulses, thereby minimizing interference therebetween.

The use of the single fiber in the hand-held probe, along with the pulse type illumination, provides a system of high resolution of detection of the bar code and, in addition, provides an inexpensive probe which can be discarded when worn out or defective.

DESCRIPTION OF THE PREFERRED EMBODIMENT

Figure 3:
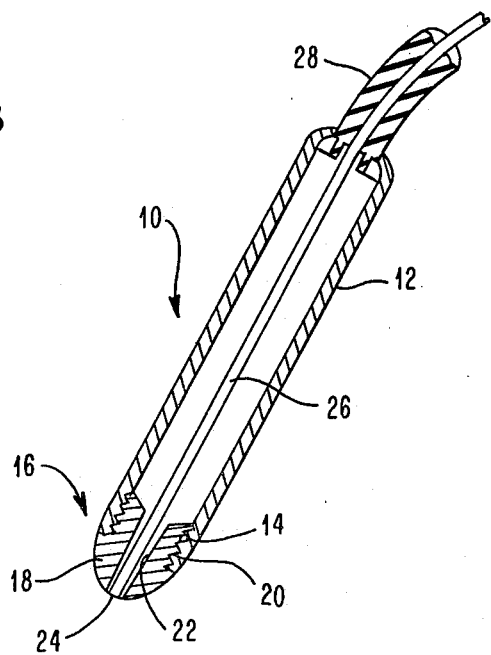
FIG. 3 is a blown-up schematic diagram of the hand-held wand showing the single fiber located therein.

Referring now to the drawing figures, an optical probe is shown generally at 10 in position to scan a bar type code. The probe 10, shown in detail in FIG. 3, has a relatively long barrel or housing 12 made of plastic or some other light suitable material such as aluminum. The housing 12 has an internally threaded section 14 at the scanning end 16 of the housing. A conically shaped tip member 18 made of a hard metal or sapphire has external threads 20 on the wide end thereof adapted to screw into the internally threaded portion 14 of the housing 12 to make flush engagement therewith. The conically shaped tip member 18 has a central opening 22 which extends through the apex 24 of the cone. A single fiber 26 made of glass or plastic extends through the housing 12 and through the opening 22 running through the center of the tip member 18. The fiber 26 terminates at the opening 22 at the apex 24 of the cone shaped tip member 18. The jacket 28 of the portion of the fiber 26 which extends into the housing 12 is removed before it is placed in the housing and the tip member. The jacketed portion of the fiber 26 is attached to the upper end of the housing 12 by gluing or other attachment means.

The probe-type scanner 10 is usually utilized at an operating station 30. A connector 32 is usually provided somewhere near the station 30 to detachably connect an optical fiber link 34 from the operating station 30 to the terminal unit 36. Similarly, a connector 38 is made available at the terminal unit 36 for detachably connecting the other end of the fiber link thereto. The reason for the connectors 32 and 38 is strictly for convenience in replacing a worn or damaged probe or to provide a new transmission link 34 between the operating station 30 and the terminal unit 36. The fiber optic communication link 34 can be of various lengths depending on the desired location of the terminal unit 36 with respect to the operating station 30 where the probe scanner 10 is to do the reading of the coded information. The ideal length would be sufficient to introduce enough delay such that the reflected pulses would be in between the transmitted pulses. However, this is not critical since the terminal unit 36 can include a fiber coil 40 in the optical line which introduces the desired delay.

The terminal unit 36 includes all of the optics, drivers, receivers and pulse generators for sustaining the coded information scanning and reading. None of these are located in the probe scanner 10. The terminal unit 36 includes pulse generating circuits 42 and a driver circuit 44 for generating optical pulses of a predetermined width at the required frequency and transmitting them over the optical link 34 through the wand or probe 10 so that they are beamed onto the bar code and correspondingly reflected. It should be appreciated, that the reflections will depend on the material of the bar code and the material upon which the bars are placed, in other words, the spaces between the code bars. These reflected pulses are picked up by the single optic fiber 26 in the scanner tip 18 and transmitted via the single fiber to the terminal unit 36 where they are received by a suitable receiver 46 and the bar code essentially decoded in the recovery circuits 48. The transmitted and received optical pulses in the terminal unit 36 are separated by the correct selection of the transmitted pulse width and frequency and the bar code width and spacing.

Figure 5:
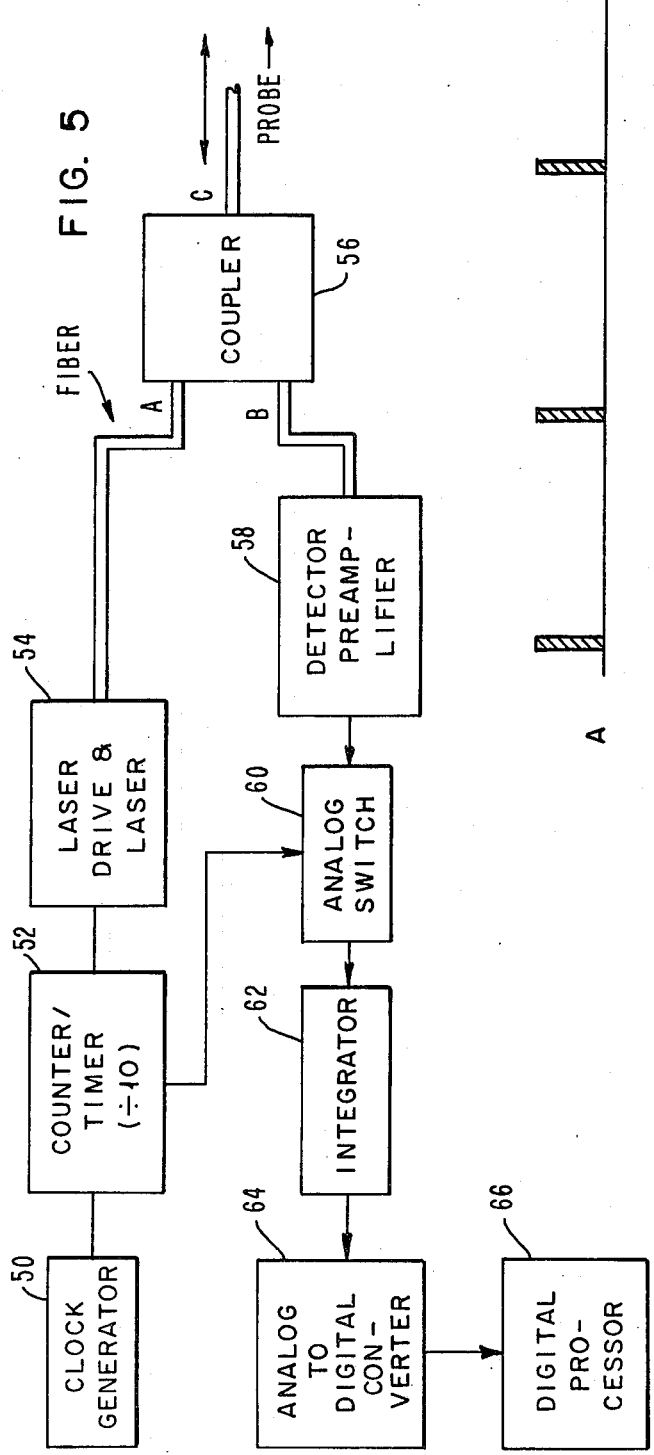
FIG. 5 is a schematic block diagram showing the optical pulse transmitter and receiver in the remote terminal.

The pulse generation and driver circuits 42 and 44 as well as the receiver and recovery circuits 46 and 48 are shown in more detail in the block diagram of FIG. 5. A clock generator 50, produces a 10 MHz square wave that feeds a divide by ten counter/timer 52. The counter/timer provides two outputs. One output is connected to the laser driver and laser 54 and the other to analog switch 60. The laser driver 54 light output pulses are connected through a single fiber to a coupler 56 which passes the light pulses to the single fiber link which carries the pulses to the probe scanner where they are beamed onto the bar code. The light pulses reflected from the bar code enter the end of the single fiber in the probe, pass through the single fiber link 34 and are passed through coupler 56 to the detector/preamplifier 58. The detector/preamplifier 58 converts the received light pulses to electrical signals that feed the analog switch 60. The analog switch is operated only during the period when return pulses occur, see waveform C of FIG. 6. High intensity laser output pulses are only partially coupled (or reflected) by the coupler 56 even though typical coupler devices have some directional properties. Since the analog switch 60 is only actuated during the time that the appropriate signals are present, adverse laser output signals do not enter the integrator 62. A timing gate or window is provided by the counter/timer 52. The output of the integrator 62 feeds an analog to digital converter 64 which produces digital representations of the pulse amplitudes. These amplitudes are stored in the digital processor 66. The processor tracks the varying amplitude of the return pulses, averages signals, detects positive and negative peaks, and determines a threshold halfway between the peak values. In addition to this preprocessing, the digital processor decodes the meaning of the bar code for further information transfer.

Figure 6:
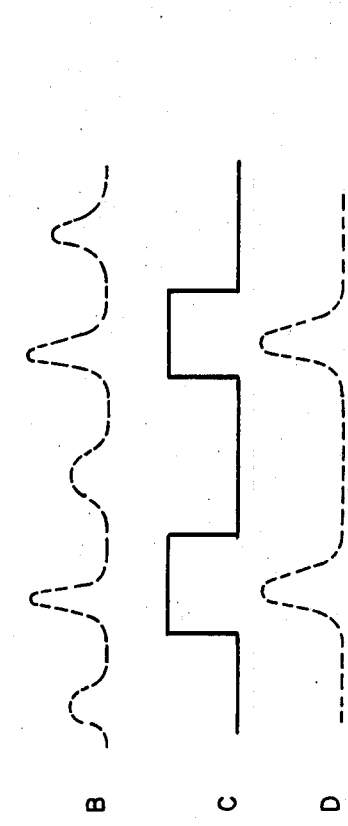
FIG. 6 is a schematic representation of the driver and receiver timing function pulses utilized in FIG. 5.

Referring to FIG. 6, waveform A shows a schematic representation of the laser light output from the laser driver and laser 54. These are the light pulses that are sent over the optical fiber link 34 to the probe 10 for reflection from the coded information bars. The reflected pulses after being detected and amplified are shown as pulse waveform B representing the input to the analog switch 60. The analog control switch 60 is opened for a preset window time as shown in waveform C of FIG. 6. This window is determined, as previously mentioned, by the output from counter/timer 52. The pulse existing during the window time is sent to the integrator 62 and subsequently converted to digital representation and sent to the digital processor 46 for decoding and further operations.

Figure 2:
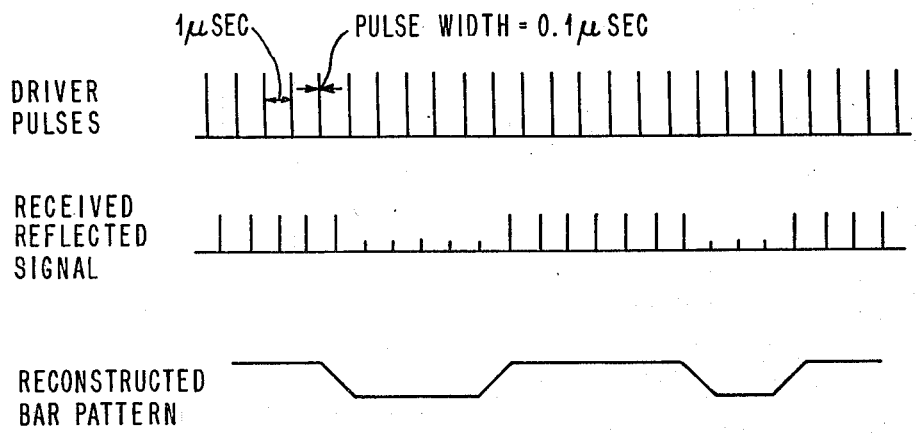
FIG. 2 is a schematic representation of the driver scanning pulses and the received reflected signals from the bar code.

The wavelength of transmission of light pulses is selected to provide sensing of many colors of bar codes. It is nominally 1 MHz ($10^{-9}$ meters). A typical probe should operate at speeds from 2 to 20 inches per second and detect bars and spaces as narrow as 0.01 inches (10 mils.). At the 1 MHz pulse per second rate and 2 inches per second wand speed, 5,000 pulses will be reflected by this minimum width bar or space (500,000 pulses per inch $\times$ 0.01 inches). At 20 inches per second probe speed, 500 pulses will be reflected. Both cases represent adequate pulses for reliable processing. A schematic representation of the driver pulses and received reflected pulses are shown in FIG. 2 as well as the reconstructed bar pattern from the driver pulses and received reflected signals. It should be noted that there is a separation between the pulses of one microsecond and the pulse width itself is equal to 0.1 microseconds.

Figure 1:
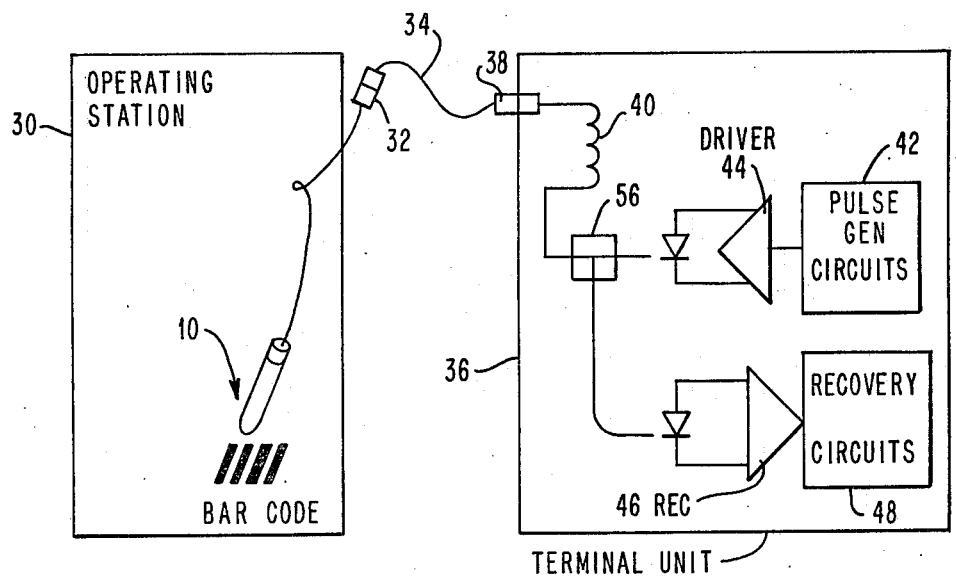
FIG. 1 is a schematic diagram of the present invention showing the bar code reading wand and the terminal where the light pulses are transmitted and received.
Figure 4:
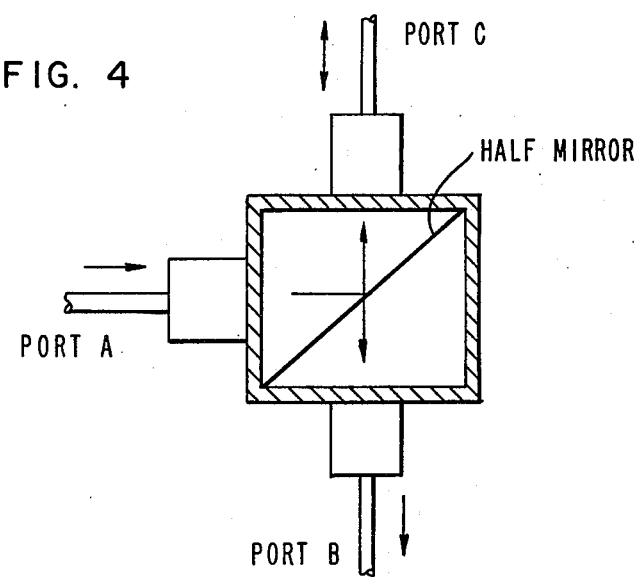
FIG. 4 is a schematic diagram showing the details of the coupler in the remote terminal.

The coupler 56 shown in FIGS. 1 and 5 is shown in further detail in FIG. 4. The coupler is known as a threeport coupler which uses a half mirror and generally uses lenses to couple in and out of the half mirror element. This type of coupler has directional properties. The arrangement is such that the light signals are sent to the coupler 56 from the laser driver and laser 54 through port A which via the half mirror unit sends the pulse information out on port C to the probe. When the reflected pulse information is received at port C of the coupler 56, it is sent out on port B to the detector/preamplifier 58.

The following example is given to make clear the timing involved in the pulse generation and receiving. Assume the pulse repetition rate to be 1 MHz and the pulse width to be 100 ns. If the reflected pulses are to arrive about 500 ns after a transmitted pulse is generated, the total fiber length would be about 166 feet. (Light travels at about 1.5 ns per foot) The length of coil 40 would insure the proper delay, but obviously this need not be critical. If the wand is passed over a bar code in 0.1 seconds, 100,000 pulses will strike the surface and provide adequate resolution for reconstruction.

Thus, a low cost wand or probe is possible with all of the optics and electronics packaged in the terminal unit and with a single optic fiber providing two way multiplexed transmission in the probe such that the probe is replaceable with the minimum of cost.

While there has been described what is at present considered to be a preferred embodiment of this invention, it will be obvious to those skilled in the art that various changes and modifications may be made therein without departing from the invention.

What is claimed is:

1. A fiber optic scanner system for reading coded patterns comprising:
   a scanner housing;
   a scanner tip forming one end of said housing adapted to be moved across a coded pattern;
   a connector end located at the other end of said housing characterized by;
   a single optical fiber transmission line located in said housing and having the reading end located in reading position within said scanner tip and the other end emerging from said connector end of said housing;
   a remote terminal unit associated with the scanner;
   a single optical fiber link connected between the scanner and said remote terminal unit;
   an optical signal generator located in said remote terminal for producing and transmitting optical pulses of a given width and at a predetermined frequency through said single optical fiber link to said scanner and through said optical fiber transmission line in said housing to said scanner tip;
   a receiver located in said remote terminal unit for receiving light pulses reflected from the coded pattern into the reading end of said single optical fiber transmission line located in said scanner tip;
   and a light coupler located in said remote terminal unit for coupling reflected light pulses from said single optical fiber link into said receiver;
   said optical signal generator pulse width and frequency and the bar code width and spacing being selected to produce the reflected light pulses between the generated light pulses thereby minimizing interference therebetween.

2. A fiber optic scanner system according to claim 1, wherein said scanner housing includes an elongated housing portion having said optical fiber transmission line extending lengthwise therethrough.

3. A fiber optic scanner system according to claim 1, wherein said scanner tip has a threaded portion thereon adapted for engagement with a threaded portion on said housing.

4. A fiber optic scanner system according to claim 2 wherein said connector end of said scanner housing has said single optical fiber transmission line attached thereto so that the fiber extends into the housing and into said scanner tip a predetermined amount to produce reading of coded patterns over which said scanner housing is moved.

5. A fiber optic scanner system according to claim 1, wherein a fiber optic connector is located near said connector end of said scanning member to allow the connecting and disconnecting of said scanning member to said single optical fiber link.

6. A fiber optic scanner system according to claim 1, wherein said fiber optic link is of a minimum length to give the require freedom of movement of said scanning member to perform the reading, and of a maximum length to provide a delay which maintains reflected light pulses received from said encoded pattern between the light pulses generated by said light pulse generator.

7. A fiber optic scanner system according to claim 1, wherein a delay coil is located in said remote terminal unit to introduce a predetermined delay to the optical pulses generated by said optical signal generator and said reflected light pulses received by said receiver.

8. A fiber optic scanner system according to claim 7, wherein said delay coil and said fiber optic link introduce sufficient delay to maintain reflected light pulses halfway between optical pulses generated by said optical signal generator.

9. A fiber optic scanner system according to claim 1, wherein said light coupler is directional so as to couple optical pulses from said optical signal generator in the forward direction only, thereby avoiding interference from said reflected light pulses.

10. A fiber optic scanner system according to claim 1, wherein said light coupler couples said reflected light pulses into the receiver and blocks from the receiver said generated light pulses from said optical signal generator.

* * * * *